United States Patent Office 3,481,954
Patented Dec. 2, 1969

3,481,954
OZONOLYSIS PRODUCTS OF HEXA-
CHLORODICYCLOPENTADIENE
John Edward Franz, Crestwood, Mo., assignor to Monsanto Company, St. Louis, Mo., a corporation of Delaware
No Drawing. Continuation-in-part of application Ser. No. 439,966, Mar. 15, 1965. This application Sept. 18, 1968, Ser. No. 760,717
Int. Cl. C07d 17/00; C07c 75/00
U.S. Cl. 260—340.3                5 Claims

ABSTRACT OF THE DISCLOSURE

This invention relates to novel ozonolysis products of hexachlorodicyclopentadiene, such as 6,7,8,9,10,10-hexachloro - 4,5,5a,6,9,9a - hexahydro - 4 - methoxy-6,9-methano-1H-2,3-benzodioxepin-1-ol, which are useful as organic intermediates in preparing 2-carboxy-3-carboxymetyhl-1,4,5,6,7,7-hexachlorobicyclo (2.2.1) heptene-5 which is useful as a fire retardant intermediate for polyester and polyurethane resins.

This application is a continuation-in-part of copending application, Ser. No. 439,966, filed Mar. 15, 1965, now abandoned.

This invention relates to a new class of chemical compounds. More particularly, the invention relates to novel ozonolysis products of hexachlorodicyclopentadiene and to a method of preparing such compounds. Specifically, the invention relates to novel ozonolysis products of hexachlorodicyclopentadiene represented by the structural formula

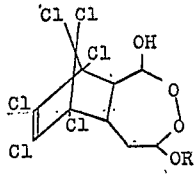

where R is alkyl having from 1 to 8 carbon atoms, acetyl, propionyl, butyryl, pentanoyl, hexanoyl, heptanoyl, octanoyl and benzoyl.

This invention is particularly concerned with a new class of compounds having utility as intermediates in organic synthesis, as in the preparation of 2-carboxy-3-carboxymethyl - 1,4,5,6,7,7 - hexachlorobicyclo (2.2.1) heptene-5.

It is a primary object of this invention to provide novel ozonolysis products of hexachlorodicyclopentadiene.

A further object of this invention is to provide a new and useful method for the preparation of such ozonolysis products of hexachlorodicyclopentadiene.

A still further object is to provide a novel class of ozonolysis products of hexachlorodicyclopentadiene which serve as intermediates in the preparation of 2-carboxy-3-carboxymethyl - 1,4,5,6,7,7 - hexachlorobicyclo (2.2.1) heptene-5.

It has been found that ozonolysis products of hexachlorodicyclopentadiene of the general formula

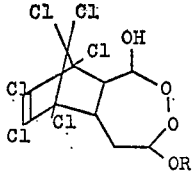

where R has the same meaning as previously noted may be prepared by oxidizing a mixture of hexachlorodicyclopentadiene and an organic reactive hydroxy compound with ozone in the presence of a solvent which is substantially inert to ozone under the conditions of reaction.

Representative inert solvents of this nature include methyl formate, ethyl formate, ethyl acetate, chloroform, methylene chloride and carbon tetrachloride and the like.

In general, the ozonization is carried out with a mixture of oxygen and ozone containing from about 1 to 10% ozone. Ozone is produced by a silent electric discharge in air or oxygen by methods well known in the art. A device in which ozone is generated is commonly known as an ozonator.

The molar ratio of the organic reactive hydroxy compound to hexachlorodicyclopentadiene can vary from as low as 1:1 to as high as 15:1. A molar ratio of the organic reactive hydroxy compound to said olefin in the range of from about 1.5:1 to about 3:1 is preferred.

The temperature required for the reaction can be varied from —50 to 25° C. However, a temperature range of —5 to 5° C. is preferable.

Suitable organic reactive hydroxy compounds for use in preparing the ozonolysis products of this invention include monohydric saturated aliphatic alcohols such as methyl alcohol, ethyl alcohol, propyl alcohol, butyl alcohol, amyl alcohol, hexyl alcohol, heptyl alcohol and octyl alcohol; alkanoic acids such as acetic acid, propionic acid, butyric acid, pentanoic acid, hexanoic acid, heptanoic acid and octanoic acid; and aromatic monocarboxylic acids, for example, benzoic acid and the like.

The invention will be more fully understood by reference to the following examples which describe the detailed preparation of representative compounds. There are, of course, many other forms of this invention which will become obvious to one skilled in the art once the invention has been fully disclosed, and it will accordingly be understood that these examples are given for the purpose of illustration only, and are not to be construed as limiting the scope of this invention in any way.

EXAMPLE 1

A 200 ml. three neck round bottom flask equipped with condenser, stirrer and thermometer is charged with 33.9 grams (0.1 mole) of hexachlorodicyclopentadiene, 39.5 grams (1.2 moles) of methanol and 70 mls. of methylene chloride and cooled to —5° C. A 6% ozone stream is admitted to the agitated solution for three hours. The resulting colorless solution is concentrated on a Rinco evaporator at reduced pressure. The 42.6 grams of white semi-solid residue obtained is washed with 25 ml. of 98% formic acid and filtered. The insoluble crystalline product is washed with formic acid and recrystallized in benzene to yield 21.0 grams (50% of theory) of 6,7,8,9,10,10-hexachloro - 4,5,5a,6,9,9a - hexahydro - 4 - methoxy-6,9-methano-1H-2,3-benzodioxepin-1-ol having a melting point of 164° C.

Analysis.—Theory: C, 31.46%; H, 2.41%; Cl, 50.65%; mol. wt. 419. Found: C, 31.61%; H, 2.53%; Cl, 50,25%; mol. wt. 397.

EXAMPLE 2

A suitable reactor is charged with 33.9 grams (0.1 mole) of hexachlorodicyclopentadiene, 63.0 grams (1.0 mole) of acetic acid and 70 mls. of methylene chloride and cooled to —5° C. A 6% ozone stream is admitted to the agitated solution for three hours. The resulting solution is concentrated on a Rinco evaporator at reduced pressure to give 45.1 grams of crude product. The crude product is purified to yield 23 grams (50% of theory) of 6,7,8,9,10,10-hexachloro - 4,5,5a,6,9,9a- hexahydro-4-acetyloxy - 6,9-methano-1H-2,3-benzodioxepin-1-ol.

EXAMPLE 3

A suitable reactor is charged with 33.9 grams (0.1 mole) of hexachlorodicyclopentadiene, 48.6 grams (0.7 mole) of butanol and 70 mls. of methylene chloride and cooled to −5° C. A 6% ozone stream is admitted to the agitated solution for three hours. The resulting solution is concentrated on a Rinco evaporator at reduced pressure to yield 46.5 grams of residue. Twenty grams (44% of theory) of 6,7,8,9,10,10-hexachloro-4,5,5a,6,9,9a-hexahydro - 4-butoxy-69 methano-1H-23-benzodioxepin-1-ol is obtained by purification of the residue.

EXAMPLE 4

A suitable reactor is charged with 33.9 grams (0.1 mole) of hexachlorodicyclopentadiene 12.5 grams (0.1 mole) of benzoic acid and 100 mls. of methylene chloride and cooled to −5° C. A 6% ozone stream is admitted to the agitated solution for three hours. The resulting colorless solution is concentrated on a Rinco evaporator at reduced pressure. The 51.0 grams of semisolid residue obtained is washed with 25 ml. of 98% formic acid and filtered. The crystalline product is washed with formic acid and recrystallized in benzene to yield 38 grams (75% of theory) 6,7,8,9,10,10-hexachloro-4,5,5a,6,9,9a-hexahydro - 4-benzoyloxy-6,9-methano-1H-2,3-benzodioxepin-1-ol.

The ozonolysis products of hexachlorodicyclopentadiene of the present invention can be readily converted to an additional valuable product. The ozonolysis products have been found to be readily oxidized to 2-carboxy-3-carboxymethyl - 1,4,5,6,7,7 - hexachlorobicyclo (2.2.1) heptene-5, which is useful as a fire retardant intermediate for polyester and polyurethane resins.

A process is thus provided for the production of 2-carboxy-3-carboxymethyl - 1,4,5,6,7,7-hexachlorobicyclo (2.2.1) heptene-5, namely converting the hexachlorodicyclopentadiene to an ozonolysis product and oxidizing the latter to 2-carboxy - 3-carboxymethyl - 1,4,5,6,7,7-hexachlorobicyclo (2.2.1) heptene-5.

The more detailed prpearation of 2-carboxy-3-carboxymethyl - 1,4,5,6,7,7-hexachlorobicyclo (2.2.1) heptene-5 from the ozonolysis products of hexachlorodicyclopentadiene is illustrated by the following examples.

EXAMPLE 5

A 25 ml. round bottom flask equipped with stirrer and thermometer is charged with 1.0 gram of the ozonolysis product prepared in Example 1, 3.0 grams 40% peracetic acid and 4 ml. acetic acid, and heated to 50° C. The temperature is maintained at 50° C. for six hours and then reduced to room temperature. The colorless solution is concentrated on a Rinco evaporator at reduced pressure. The brown granular product weighs about 1.0 gram. Recrystallization from water-methanol yields 0.6 gram of 2-carboxy - 3-carboxymethyl-1,4,5,6,7,7-hexachlorobicyclo (2.2.1) heptene-5 having a melting point of 221–222° C.

*Analysis.*—Theory: C, 29.81; H, 1.50; Cl, 52.80. Found: C, 29.84; H, 1.86; Cl, 52.55.

EXAMPLE 6

Following the procedure of Example 5, peracetic acid treatment of the ozonolysis product obtained in Example 2 produces 2-carboxy-3-carboxymethyl-1,4,5,6,7,7-hexachlorobicyclo (2.2.1) heptene-5 in high yield.

The following examples illustrate the use of 2-carboxy - 3-carboxymethyl - 1,4,5,6,7,7-hexachlorobicyclo (2.2.1) heptene-5- in the preparation of polyesters having fire retardant properties.

EXAMPLE 7

To a suitable reaction vessel equipped with a thermometer, agitator, condenser and a nitrogen purge there is charged 233.0 grams (2.2 moles) of diethylene glycol, 98.0 grams (1.0 mole) of maleic anhydride and 403.0 grams (1.0 mole) of 2-carboxy-3-carboxymethyl-1,4,5,6,7,7-hexachlorobicyclo (2.2.1) heptene-5. The mixture is heated to a temperature of about 190° C. and maintained at this temperature for about 4 hours under a nitrogen atmosphere. The pressure is then reduced to about 100–200 mm. Hg and the reaction mixture is heated at 170° C. until an acid number of about 50 is obtained. The reaction product is cooled to about 100° C. and compounded with 0.02 grams of hydroquinone and 290 grams of styrene to obtain a 70% solution of polyester. The solution, catalyzed with 1% benzoyl peroxide at 90° C. for a period of four hours, cures to a hard, tough solid resin having a chlorine content of about 22%. The resin is immediately self-extinguishing on removal from an oxidizing flame as determined by A.S.T.M. Test No. D635–44 and exhibits a low burning rate as determined by A.S.T.M. Test No. D757–49.

EXAMPLE 8

Following the procedure of Example 7, 136.0 grams (2.2 moles) of ethylene glycol, 122.5 grams (1.25 moles) of maleic anhydride and 303 grams (0.75 mole) of 2-carboxy - 3-carboxymethyl-1,4,5,6,7,7-hexachlorobicyclo (2.2.1) heptene-5 are utilized to prepare a reaction product which is diluted with 218 grams of styrene. The solution, catalyzed with 1% benzoyl peroxide at 90° C. for a period of about 4 hours, cures to a hard, tough resin which is self-extinguishing upon removal from an oxidizing flame and exhibits a low burning rate.

As will be apparent to those skilled in the art, by proper choice of the organic reactive hydroxy compound it is possible to produce a wide variety of ozonolysis products of hexachlorodicyclopentadiene.

While this invention has been described with respect to certain embodiments, it is not so limited, and it should be understood that variations and modifications thereof may be made which are obvious to those skilled in the art without departing from the spirit or scope in this invention.

The embodiments of the inveniton in which an exclusive property or privilege is claimed are defined as follows:

1. An ozonolysis product of hexachlorodicyclopentadiene of the structural formula

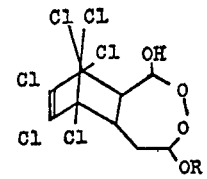

where R is alkyl having from 1 to 8 carbon atoms, acetyl, propionyl, butyryl, pentanoyl, hexanoyl, heptanoyl, octanoyl and benzoyl.

2. 6,7,8,9,10,10-hexachloro - 4,5,5a,6,9,9a-hexahydro-4-methoxy - 6,9-methano-1H-2,3-benzodioxepin-1-ol.

3. 6,7,8,9,10,10-hexachloro - 4,5,5a,6,9,9a-hexahydro-4-acetyloxy - 6,9-methano-1H-2,3-benzodioxepin-1-ol.

4. 6,7,8,9,10,10-hexachloro - 4,5,5a,6,9,9a-hexahydro-4-butoxy-6,9-methano-1H-2,3-benzodioxepin-1-ol.

5. 6,7,8,9,10,10-hexachloro - 4,5,5a,6,9,9a-hexahydro-4-benzoyloxy-6,9-methano-1H-2,3-benzodioxepin-1-ol.

References Cited

Warnell, J. L., et al:, Jour. Am. Chem. Soc. 79, June 20, 1957, pp. 3165–7.

NORMA S. MILESTONE, Primary Examiner

U.S. Cl. X.R.

260—75, 77.5, 339, 514